T. E. STUART.
TOOL HOLDER.
APPLICATION FILED DEC. 17, 1917.
1,296,133.
Patented Mar. 4, 1919.
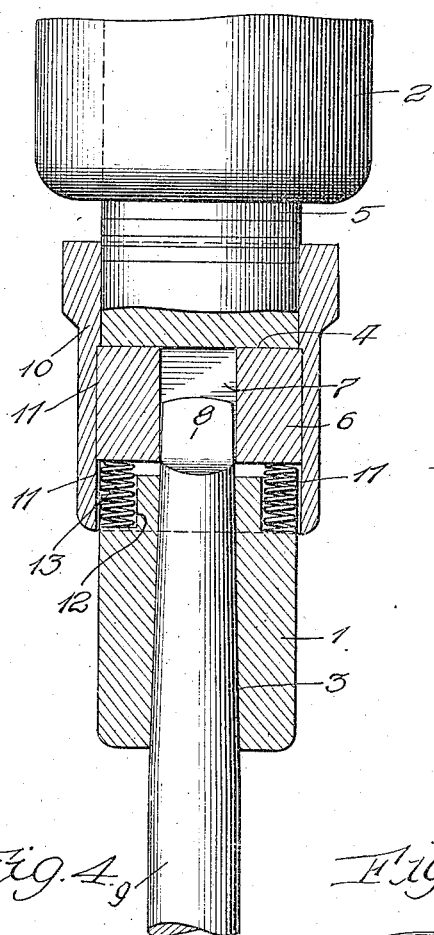
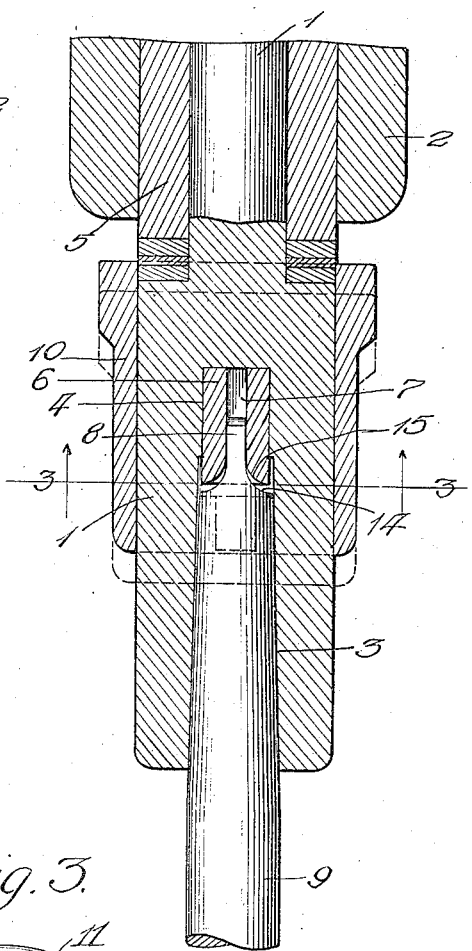
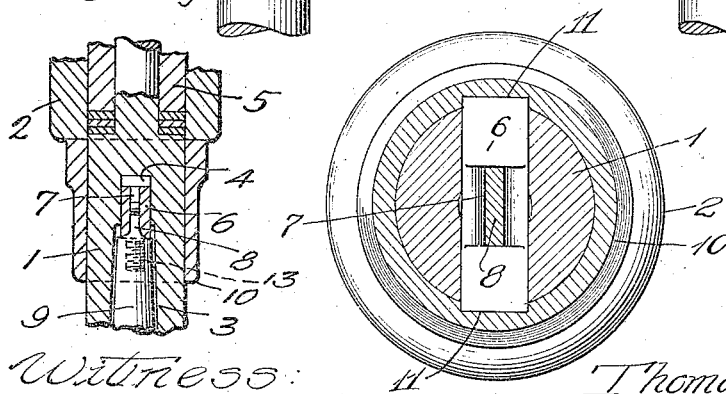
Witness:
R. L. Farrington
Inventor
Thomas E. Stuart
By Brown & Naser
Attys.

UNITED STATES PATENT OFFICE.

THOMAS E. STUART, OF COUNCIL BLUFFS, IOWA.

TOOL-HOLDER.

1,296,133.   Specification of Letters Patent.   Patented Mar. 4, 1919.

Application filed December 17, 1917. Serial No. 207,537.

*To all whom it may concern:*

Be it known that I, THOMAS E. STUART, a citizen of the United States, residing at Council Bluffs, in the county of Pottawattamie and State of Iowa, have invented certain new and useful Improvements in Tool-Holders, of which the following is a specification.

This invention relates to a tool holder with a tool releasing or discharging means which is easily operated by the same or a continued movement of the support which withdraws the tool from the work.

The invention is described in connection with an ordinary taper shank drill with an end driving tang, but, of course, may have a more general application to different tools and holders.

The invention consists in the novel construction, combination and arrangement of the parts.

In the accompanying drawing—

Figure 1 is a view partly in section of a tool holder constructed in accordance with the principles of the invention.

Fig. 2 is a sectional view at right angles to the sectional portion of the view in Fig. 1;

Fig. 3 is a sectional view taken on line 3—3 of Fig. 2; and

Fig. 4 is a sectional view of the holder in a discharging position.

It has been the practice to provide the holders of taper shank drills with a transverse slot into which the end or tang of the drill extends so that in order to release the drill a taper key must be inserted in the transverse slot and the drill dislodged by pounding on the key. This method is unsatisfactory because it takes time and requires a key of special size and the tool holder must come to a stop before the key can be inserted. In the present invention a drill can be released and discharged by simply moving the tool-holding spindle inwardly until the releasing means carried thereby engages the spindle bearing, which thereupon operates to disengage and discharge the drill.

In the present invention, a tool support or spindle 1 is rotatably and reciprocably mounted in a fixed bearing 2, and has a tapered bore 3 at the outer end, with a transverse slot 4 at a distance from the end of the support and at the inner end of the bore. A bearing sleeve 5 may be provided for the upper end of the spindle surrounding that portion which moves in the fixed bearing 2.

Positioned in the transverse slot 4 is a member 6, having a socket 7 for engaging the tang 8 of a tool 9, which is inserted in the bore 3. The ends of this member 6 preferably project an equal distance from the opposite sides of the support 1, and a sleeve 10 slidable upon the support is formed with recesses or grooves 11 on opposite sides and extending from one end for engaging the projecting ends of this socketed member 6. At the ends of the transverse slot, and below the socketed member 6, as shown in Fig. 1, are recesses 12 normally covered by the sleeve 10 in which springs 13 are positioned which tend to press the member 6 upwardly or away from the end of the support 1. As shown more clearly in Fig. 2, the tang 8 is usually formed by rounding off the opposite sides 14 at the end of the tool, and the lower edges 15 of the socket 7 is, therefore, correspondingly rounded so that the shoulders adjacent the tang of a tool can be engaged by the socketed member.

In operation a tool is normally held with the socketed discharging member 6 in the position shown by Figs. 1 and 2, and in order to disengage or dislodge the tool from the holder, it is necessary only to move the support 1 relatively to the bearing 2 by any suitable means, as for example, that employed in the well-known manner for advancing and withdrawing the tool from its work, and by withdrawing the support 1 from the work until the upper end of the sleeve 10 engages the lower end of the bearing 2, the sleeve 10 and the member 6 are moved relatively to the support 1 which compresses the springs 13, and this relative movement causes the engagement of the rounded lower edges 15 of the socketed member with the shoulders 14 adjacent the tang 8, thereby disengaging the tapered portion of the tool shank from the correspondingly tapered bore 3 of the support. In the discharging position the sleeve 10 will assume the broken outline position shown in Fig. 2 relatively to the position shown in full lines. The movement of the sleeve is limited by the size of the slot of the transverse slot 4, it being found that a comparatively slight movement is sufficient to effect the dislodging and discharging action.

In assembling the parts as shown, the support 1 is first moved out of the bearing, the sleeve is slid on the support above the transverse slot 4, the member 6 is inserted in the slot, and the springs 13 are placed in position, whereupon the sleeve may be moved downwardly over the ends of the member 6, covering the springs 13 and the recesses 12, the ends of the member 6 engaging in the slots 11 at the opposite sides of the sleeve. It is obvious that this construction can be readily applied to drills and other tool supports now in use with very little alteration.

I claim:—

1. A tool support having a tapered bore at the end and a transverse slot across the bore a distance from the end, a member movable in the slot toward and from the bore and having a socket adapted to engage the tang of a tool for holding it against rotation, the sides of the socket being adapted to engage the shoulders of the tang to positively eject a tool from engagement with the socket and the bore when the member is moved toward the end of the support, and a spring tending to press the member in a direction away from the end of the support.

2. The combination with a tool having a tapered shank and a tang at the end thereof, a tool support therefor having a tapered end bore and a transverse slot at the inner end of the bore, a member slidable in the slot toward and from the bore having a socket adapted to engage the tang of the tool, the sides of the socket being adapted to engage the shoulders of the tang when the member is moved in the slot toward the outer end of the bore and thus disengaging the tool from the tapered bore, and resilient means tending to hold the member at the upper end of the slot where the sides of the socket do not engage the shoulders of the tang.

3. The combination with a tool support for a taper shank tool having a tapered end bore with a transverse slot at the inner end of the bore, of a member slidable longitudinally in the slot and having a socket to engage the tang of a tool, the tapered bore limiting the insertion of a tool, resilient means tending to press the member away from the end bore, a fixed bearing in which the support is movable to advance and withdraw the tool support, and a sleeve attached to the member and moved by the support against the fixed bearing in withdrawing the support and a tool from the work to compress the resilient means and thereby to engage the edges of the socket with the shoulders of a tang of a tool to positively engage and force a tool from its engagement with the tapered portion of the bore.

4. The combination with a tool support having a tapered end bore and a transverse slot at the inner end of the bore with recesses at the opposite edges of the slot nearest the end of the support, a socketed member slidable in the slot adapted to engage the tang of a tool, springs disposed in said recesses on opposite sides of the bore and tending to press the said member away from the end of the support, and a sleeve connected to the ends of the socketed member and movable with it to expel a tool from the bore, the edge of the sleeve overlapping the recesses and covering the springs disposed therein.

5. The combination with a fixed bearing, of a rotatable and reciprocable tool support mounted therein having a bore at the outer end and a transverse slot at a distance from the end intersecting the end of the bore, a socketed member disposed in the slot to engage the tang only of a tool and slidable longitudinally of the support with ends projecting beyond the sides of the support, a sleeve internally recessed to engage the ends of the socketed member, and springs tending to press the socketed member inwardly, the springs being compressed when the support is moved relatively to the bearing to engage the sleeve with the bearing.

6. In a tool holder for a taper shank tool, the combination with a rotatable and reciprocable tool support having a tapered bore at one end and a transverse slot at a distance from the end of the support, a member slidable in the slot longitudinally of the support and having a socket to engage the tang only of a tool with the edges of the socket rounded to conform to the curvature of the shoulders forming the tang of a tool, resilient means tending to press the member away from the end of the support, said means being located on opposite sides of the bore, a sleeve engaging the ends of the member surrounding the support and slidable thereon, and a fixed bearing in which the support is movable having an abutting portion to engage the sleeve when the support is moved inwardly in the bearing for compressing the said resilient means and moving the member to engage the rounded shoulders of the socket with the corresponding rounded shoulders of a tool to press a tool outwardly from said bore.

In testimony whereof I have signed my name to this specification on this 4th day of December, A. D. 1917.

THOMAS E. STUART.

Copies of this patent may be obtained for five cents each, by addressing the "Commissioner of Patents, Washington, D. C."